United States Patent [19]

Endres et al.

[11] Patent Number: 5,043,191

[45] Date of Patent: Aug. 27, 1991

[54] METHOD OF PROTECTING HARD SURFACES

[75] Inventors: Michael T. Endres, Woodridge; Shanker B. Patel, Tinley Park, both of Ill.

[73] Assignee: Miles Inc., Elkhart, Ind.

[21] Appl. No.: 485,648

[22] Filed: Feb. 27, 1990

[51] Int. Cl.$^5$ .............................................. B05D 3/02
[52] U.S. Cl. .................................. 427/387; 427/388.4; 427/389.7; 427/389.8; 427/393; 427/393.5; 427/393.6
[58] Field of Search ............... 427/389.5, 389.7, 389.8, 427/393, 393.5, 393.6, 387, 388.4

[56] References Cited

U.S. PATENT DOCUMENTS 4,571,303  2/1986  Ciallella .......................... 252/174.21
4,808,086  2/1989  Evans et al. ........................ 427/242

*Primary Examiner*—Michael Lusignan
*Attorney, Agent, or Firm*—Jerome L. Jeffers

[57] ABSTRACT

Hard surfaces protection is accomplished by the application of a polyester formed by the copolymerization of polyethylene terephthalate and polyoxyethylene or polyoxypropylene terephthalate thereto.

10 Claims, No Drawings

METHOD OF PROTECTING HARD SURFACES

BACKGROUND OF THE INVENTION

Various hard surface cleaning and polishing compositions are known to the art. For example, U.S. Pat. No. 4,859,359 discloses such a composition which comprises an organic solvent/water solvent mixture, an organic polysiloxane soluble in such mixture, a silane and a polycarboxylic chelating acid. This patent discloses several other materials suitable for treatment of hard surfaces, several of which contain polysiloxanes.

In British Patent 2,137,652A there is disclosed a soil release promoting liquid detergent which comprises a synthetic organic nonionic detergent or a mixture of nonionic and synthetic organic anionic detergents and a soil release promoting proportion of a copolymer of polyethylene terephthalate and polyoxyethyleneterephthalate in an aqueous medium.

SUMMARY OF THE INVENTION

The present invention involves a method of protecting hard surfaces by the application to said surface of a dispersion of a polyester formed by the copolymerization of polyethylene terephthalate and polyoxyethylene or polyoxypropylene terephthalate and allowing the dispersion's carrier to dry thereby leaving an even layer of the polyester on the treated surface.

DESCRIPTION OF THE INVENTION

Polymers suitable for use in the present invention include copolymers of polyethylene terephthalate and polyoxyethylene terephthalate or polyoxypropylene terephthalate. Typically, the initial molecular weight of the polymer will be in the range of about 15,000 to 50,000 preferably from 19,000 to 43,000 and ideally from 19,000 to 26,000. The polyoxyethylene or polyoxypropylene units of the copolymer typically have a molecular weight range of from about 1,000 to 10,000, preferably from 2,500 to 6,000 and ideally from 3,000 to 4,000. In such polymers the molar ratio of polyethylene terephthalate to polyoxyethylene or polyoxypropylene terephthalate units will typically be in the range of 2:1 to 6:1 and preferably from 3:1 to 4:1, e.g. about 3:1. The proportion of ethylene oxide to phthalic moiety in the polymer will desirably be at least 10:1. Ratios of 20:1 or greater are desirable with those of 20:1 to 30:1 being preferred thereby providing a polymer which may be considered as being essentially modified ethylene oxide polymer with the phthalic moiety being only a minor component thereof.

The polymeric material is available commercially, either as a dry powder, e.g. Alkaril SRP from Alkaril Chemicals which can be dispersed in an aqueous carrier or in the form of an aqueous dispersion, e.g. Alkaril QCJ from Alkaril Chemicals, Milease T from ICI Americas Inc. or Zelcon 5126 from Dupont. One or more polar organic carriers, e.g. a glycol, glycol ether, terpene or alcohol can be used in lieu of water when desired to form a dispersion containing from about 0.1 to 35% (wt/wt) of the polymeric material. All percentages mentioned herein are weight percentages of the polyester dispersion. Multiple applications are necessary to obtain the optimal level of protection at concentrations below 1% and, while concentrations above about 35% are not detrimental, additional protection has not been observed with higher levels of polymer.

When a formulation having cleaning as well as protecting capabilities is desired, one can add detergent builders such as sodium bicarbonate, sodium carbonate, a sodium silicate, a tripolyphosphate or sodium citrate. When used, the detergent builder will typically be employed at a level of up to about 5%. In addition up to 50%, of a cationic, anionic or nonionic surfactant and/or combinations thereof such as an ethoxylated alcohol, an ether sulfate or an alkyl sulfate can be added to the formulation. Besides providing additional cleaning power the detergent allows the formulation to form a more even layer when applied to the surface to be protected. One or more solvent, such as alcohol, a glycol ether, a terpene, pine oil, d-limonene or mineral spirits can be used in amounts up to about 40% of the formulation to enhance its cleaning performance as well as an abrasive such as calcium carbonate, talc or pumice to provide a softscrub formulation. When wood surfaces are to be treated a soap such as flax soap (a linseed oil or fatty acid derived soap) can be added at a level up to about 50 wt. %. A silicone resin such as Masil 1066D or Dow DC-346 can be added at a level up to about 25% to enhance the shine on the protected surface and a small amount of brightener ($<1.0\%$) such as Tinopal 5BM can be added to increase the reflectance of the treated surface.

The above mentioned concentrations describe a formulation which is ready to apply to the hard surface to be protected. For convenience sake, one may prefer to market a product which is concentrated by removal of part or all of the carrier. At the time of use, such a concentrated formulation can simply be diluted out with water to provide a dispersion having the desired level of functional ingredients.

For good shelf life, the formulation should have a pH within the range of about 3.0 to 9.5 (preferably 5.0 to 8.0) to prevent hydrolysis of the polyethylene terephthalate/polyoxyethylene-polyoxypropylene terephthalate copolymer. The desired pH range can be maintained by the addition of suitable amounts of a buffer such as sodium carbonate, sodium bicarbonate, sodium citrate or mixtures of these and/or other buffers to the formulation.

The formulation can be used to clean and protect any suitable hard surface such as Formica, vinyl tile, ceramic tile, porcelain, enamel, wood, painted surfaces, fiberglass, glass, various solid metal surfaces, plastics and plated metals. It can be applied using such dispensers as aerosols, pump sprays, trigger sprays or wiped on with a sponge or paper towel. Once applied to the surface, the protective layer is wiped dry with a suitable material, i.e. sponge or paper towel. The treated surface should ideally be thoroughly dry before water or soil is added thereto. On some surfaces, a rainbow haze is observed upon formation of the protective, polymeric layer. This can be removed by buffing with a wet or dry cotton cloth or chamois. An alkaline cleaner such as Formula "409" cleaner from Clorox can be used to remove the protective layer from the surface when desired.

The method of practicing the present invention and the results achieved thereby are further illustrated by the following examples.

EXAMPLE I

The tests described herein involved the use of an aqueous dispersion of Alkaril SRP from Alkaril Chemicals, Inc. The dispersion contained about 10% by weight of a copolymer of the type described as being useful herein in which the molar ratio of ethylene oxide to phthalic moiety is about 22:1.

This dispersion was applied to formica panels by applying a small amount of the dispersion to half of the panel as evenly as possible with a cotton cloth and allowing it to air dry for 30 minutes. The treated and untreated sides were marked with black crayola and each side was cleaned with "Fantastik", a cleaner from Dow Brands, using a weighted device, i.e. a solid stainless steel holder weighted to 3 pounds with an attached metal handle. The holder is designed to hold a 1.5"×3.5"×0.5" block of wood which is wrapped with a 9"×24.5" piece of cheese cloth as wiper. The number of wipes required to remove the crayola mark were measured for both sides. The results were:

Number of Wipes

| Trial No. | Number of Wipes for 100% Soil Removal | |
|---|---|---|
| | Treated | Untreated |
| 1 | 7 | Over 20 |
| 2 | 8 | Over 20 |
| 3 | 7 | Over 20 |
| 4 | 4 | Over 20 |
| 5 | 5 | Over 20 |

EXAMPLE II

Panels of formica, ceramic tile and fiberglass were treated in the manner described in Example I. Additional panels were treated in a similar manner with dispersions of other materials known to be useful as protective agents for hard surfaces. Representative of these materials whose concentrations were at or above those recommended by their suppliers are:

| Protectant | Composition | Manufacturer |
|---|---|---|
| DPSC 235-157 | Quat/Silicone/Cornuba/Petro Dist. | Sherex |
| Masil 295 | Silicone Resin | Mazer |
| DC-346 | Amino Func. Silicone Emulsion | Dow Corning |
| Masil 123 | Amino Func. Silicone Fluid | Mazer |
| GP-6 | Amino Func. Silicone | Genesse Polymer |
| Wax & Dry | Waxes/Mineral Oil/Silicone/Antistat | Kimberly Clark |

The coated surfaces were independently soiled with crayon, sebum and soap scum and tested for the effort required to remove them as in Example I. The results of these tests for the various surfaces, formica, ceramic tile and fiberglass are set out in the following table:

| Protectant | No. of Wipes for 100% Soil Removal | | |
|---|---|---|---|
| | Crayon | Sebum | Soap Scum |
| Ceramic Tile | | | |
| DPSC 235-157 | 7 | 2 | 4 |
| Masil 295 | 3 | 2 | 3 |
| DC-346 | 1 | 2 | 1 |
| Masil 123 | 2 | 1 | 7 |
| GP-6 | 9 | 3 | 2 |
| Wax & Dry | 5 | 2 | 2 |
| Alkaril SRP | 1 | 1 | 1 |
| Control | 7 | 3 | 4 |
| Fiberglass | | | |
| DPSC 235-157 | 20 (25%) | 4 | 20 |
| Masil 295 | 20 (0%) | 3 | 4 |
| DC-346 | 20 (75%) | 3 | 10 |
| Masil 123 | 20 (25%) | 4 | 20 |
| GP-6 | 20 (0%) | 4 | 14 |
| Wax & Dry | 20 (25%) | 3 | 11 |
| Alkaril SRP | 3 | 1 | 3 |
| Control | 20 (75%) | 7 | 15 |
| Formica | | | |
| DPSC 235-157 | 20 (10%) | 5 | 13 |
| Masil 295 | 20 (0%) | 6 | 12 |
| DC-346 | 17 | 4 | 6 |
| Masil 123 | 20 (50%) | 6 | 20 |
| GP-6 | 20 (50%) | 6 | 10 |
| Wax & Dry | 19 | 6 | 10 |
| Alkaril SRP | 3 | 2 | 4 |
| Control | 20 (10%) | 6 | 20 |

*Parenthesis indicate soil removal if less than 100%.

EXAMPLE III

In a separate study, the effect of protectants on enamel coated metal, soiled with crayola, was studied. The results of this study are as follows:

| Protectant | No. of Wipes for 100% Soil Removal |
|---|---|
| DPSC 235-157 | 26 |
| Masil 292 | 4 |
| DC-346 | 1 |
| Masil 123 | 3 |
| GP-6 | 9 |
| Wax & Dry | 20 |
| Alkaril SRP | 1 |
| Control | 10 |

EXAMPLE IV

Another study was conducted using Zelcon 5126, a copolymer of polyethylene terephthalate and polyoxypropylene terephthalate, in its 5% aqueous dispersion. Application of this material to formica as previously described resulted in 100% removal of crayon markings in 9 wipes (compared with 10% removal in 20 wipes for the untreated control). Application of a 10% dispersion of this material to formica resulted in 100% removal of the crayon mark with 5 wipes (compared with 0-10% removal in 20 wipes for the untreated control).

What is claimed is:

1. A method of protecting a hard surface which involves applying a dispersion of a polyester formed by the copolymerization of polyethylene terephthalate and polyoxyethylene or polyoxypropylene terephthalate to said surface and allowing the carrier to evaporate.

2. The method of claim 1 wherein the polyester makes up from about 0.1 to 35 weight % of the dispersion.

3. The method of claim 1 wherein the polyester is dispersed in water.

4. The method of claim 1 wherein the polyester is dispersed in one or more polar organic carrier.

5. The method of claim 1 wherein the polyester is a copolymer of polyethylene terephthalate and polyoxyethylene terephthalate having an initial molecular weight within the range of from about 15,000 to 50,000 in which the polyoxyethylene or polyoxypropylene units have a molecular weight range of from 1,000 to 10,000 and the ratio of polyethylene terephthalate to polyoxyethylene or polyoxypropylene terephthalate units is from 2:1 to 6:1.

6. The method of claim 5 wherein the molecular weight of the polyester is from 10,000 to 43,000; the molecular weight of the polyoxyethylene or polyoxypropylene units is from 2,500 to 6,000.

7. The method of claim 6 wherein the molecular weight of the polyester is from 19,000 to 26,000; the molecular weight of the polyoxyethylene or polyoxypropylene units is from 3,000 to 4,000 and the ratio is from 3:1 to 4:1.

8. The method of claim 1 wherein there is combined with the polyester dispersion one or more additional materials selected from the group consisting of detergent builders, surfactants, organic solvents, abrasives, soaps and silicones.

9. A method for the protection of hard surfaces which comprises applying a dispersion of a copolymer of polyethylene terephthalate and polyoxyethylene terephthalate, wherein the molecular weight of the copolymer is from 15,000 to 50,000; the molecular weight of the polyoxyethylene units is from 1,000 to 10,000 and the ratio of polyethylene terephthalate to polyoxyethylene terephthalate units is from 2:1 to 6:1, to said surface and allowing the carrier to evaporate.

10. The method of claim 9 wherein the molecular weight of the copolymer is from 19,000 to 26,000; the molecular weight of the polyoxyethylene units is from 3,000 to 4,000 and the ratio is from 3:1 to 4:1.

* * * * *